United States Patent [19]

Hughey et al.

[11] 4,355,309

[45] Oct. 19, 1982

[54] RADIO FREQUENCY CONTROLLED LIGHT SYSTEM

[75] Inventors: Robert M. Hughey, Lewisville; James J. Fairchild, Carrollton; James H. Brown, Dallas, all of Tex.

[73] Assignee: Synergistic Controls, Inc., Carrollton, Tex.

[21] Appl. No.: 185,010

[22] Filed: Sep. 8, 1980

[51] Int. Cl.³ .......................... H04Q 9/00; H04B 7/00

[52] U.S. Cl. .......................... 340/825.53; 340/825.69; 340/696; 455/68; 367/197

[58] Field of Search ...................... 340/825.53, 825.56, 340/825.69, 696; 367/197, 199; 318/16; 455/95, 68

[56] References Cited

U.S. PATENT DOCUMENTS

| | | | |
|---|---|---|---|
| 3,906,369 | 9/1975 | Pitman et al. | 340/696 |
| 3,971,028 | 7/1976 | Funk | 340/825.69 |
| 4,141,010 | 2/1979 | Umpleby et al. | 340/825.69 |
| 4,303,911 | 12/1981 | Hulick | 340/825.69 |
| 4,305,060 | 12/1981 | Apple et al. | 340/825.69 |

*Primary Examiner*—Donald J. Yusko

*Attorney, Agent, or Firm*—Richards, Harris & Medlock

[57] ABSTRACT

A light control system includes a transmitting unit (10) having a receiver unit address (22) and an output address switch (24) for pulse modulating a digitally encoded transmission signal broadcast by a radio frequency oscillator (26). A remotely located receiving unit (28) controls the power supply to an electrical load (42) such as an electrical light in response to digitally encoded data signals transmitted by said transmitting unit (10). The receiving unit (28) includes a radio frequency receiver (32) to apply a signal to digital transmission decoders (34) and a receiver unit address decoder (36). Upon detecting a transmitted signal encoder for said receiving unit (28) an output latch (38) sets an opto-isolated relay circuit (40) to connect or disconnect power to the electrical load (42).

10 Claims, 10 Drawing Figures

RADIO FREQUENCY CONTROLLED LIGHT SYSTEM

TECHNICAL FIELD

This invention relates to radio frequency controlled electrical systems, and more particularly to a battery operated transmitter for addressing a remote receiver with a selectable coded signal for controlling the operation of an electrical light.

BACKGROUND ART

Radio frequency control systems are well known in the art for the remote control of electrical loads, such as household appliances, television receivers and electrically operated garage doors. Such radio frequency control systems allow a user to control a remote electrical load by means of turning on a transmitter to broadcast a signal in the radio frequency spectrum to a tuned receiver to operate the power supply to the electrical load. Existing remote control systems include transmitters and receivers matched by a frequency selection, and digitally encoded transmitter signals paired with a digital decoding receiver network for controlling a power supply.

Systems for remotely controlling the consumption of electrical energy by lighting fixtures can promote the conservation of energy in controlling lights which remain energized when no longer needed. The power supply to incandescent and fluorescent lighting systems are generally controlled by mechanical on/off switches which are wired to the power supply and the electrical lights to form an electrical network open or closed by the switch. Such mechanical switches must be operated at the site of the light and they require additional wiring to connect them to any centralized energy management system. Wasted electrical consumption through the energization of unnecessary lighting fixtures occurs in homes, factories and offices. High-rise office buildings and large factories present special problems in an energy conservation program due to the large number and the location of switches controlling the large number of electrical lights in such buildings. A need has thus arisen for an improved switch for use in a light control system for office buildings, homes and factories.

Conventional wall switches connected through a wiring network to a power supply and electrical light fixtures also present a problem in "open landscaped" offices in the location of the control switches and conduits for wires leading to the electrical light. Interior office design has moved toward such "open landscape" planning, where offices and rooms are separated from one another by movable partitions which do not extend to the ceiling of the room. As a result, conventional lighting systems in such an office arrangement must be wired through the floor and present problems in initially locating the wall switch on the movable panels and in changing the wiring arrangement necessary to accommodate the frequent changes in such office layouts.

A need has thus arisen for a simple, low-cost and effective remote control system for electrical lighting fixtures in homes, offices and factories which is easily installed without wires connecting the system to the light fixture and which is suitable for use in an energy management system for remote control of a large number of lights.

DISCLOSURE OF THE INVENTION

In accordance with the present invention, a battery powered radio frequency transmitter (frequency range from 315 to 365 MHz.) is activated by depressing a momentary switch to cause a duty cycle timer to transmit a pulse encoded signal for a brief period of time. A digital encoder is provided for selecting one of 512 discrete transmission codes, and the transmission code may be reprogrammed by the user. A user programmable receiver code is also provided for selectively addressing a receiver to activate the power supply to a light fixture. A line powered radio frequency receiver detects the transmitted radio frequency signal, and it includes digital and address decoders for comparison with the encoded signal from the transmitter to determine if there is a match. The digital decoder and address decoder for decoding the received data pulses may also be reprogrammed in the field to reset the digital and address codes to match a particular transmitting unit. The output pulse from the digital and address decoders serves as a clock to latch the control state (on/off) sent by the transmitter for controlling an opto-isolated solid state relay for turning the electrical light on or off.

In accordance with another aspect of the invention, the radio frequency receiver circuitry includes memory means for retaining the control state (on/off) sent by the transmitter, so that the control state information is not lost in the event power is interrupted to the electrical light system.

In accordance with yet another aspect of the invention, a plurality of radio frequency receivers have their digital and address decoders selected to respond to the digital encoded control pulses from a single transmitter. A multiple radio frequency receiver unit may also have a digital decoder responsive to one digital encoded transmitted pulse from a single transmitter and separate addresses for each of the receiver circuits controlling an individual light source, such that a single transmitter unit with multiple switches may control multiple receivers separately.

In accordance with yet another aspect of the present invention, a master override signal from a master transmission unit may be used in an energy management system for selectively controlling certain electrical lights by broadcasting a signal to the radio frequency receivers controlling the lights.

BRIEF DESCRIPTION OF DRAWINGS

A more complete understanding of the present invention and its advantages will be apparent from the following Detailed Description taken in conjunction with the accompanying drawings in which.

DETAILED DESCRIPTION

Figure 1:
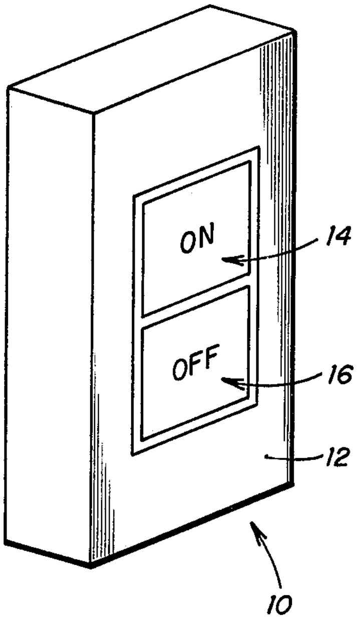
FIG. 1 is a perspective view of a transmission unit of the present invention.
Figure 3:
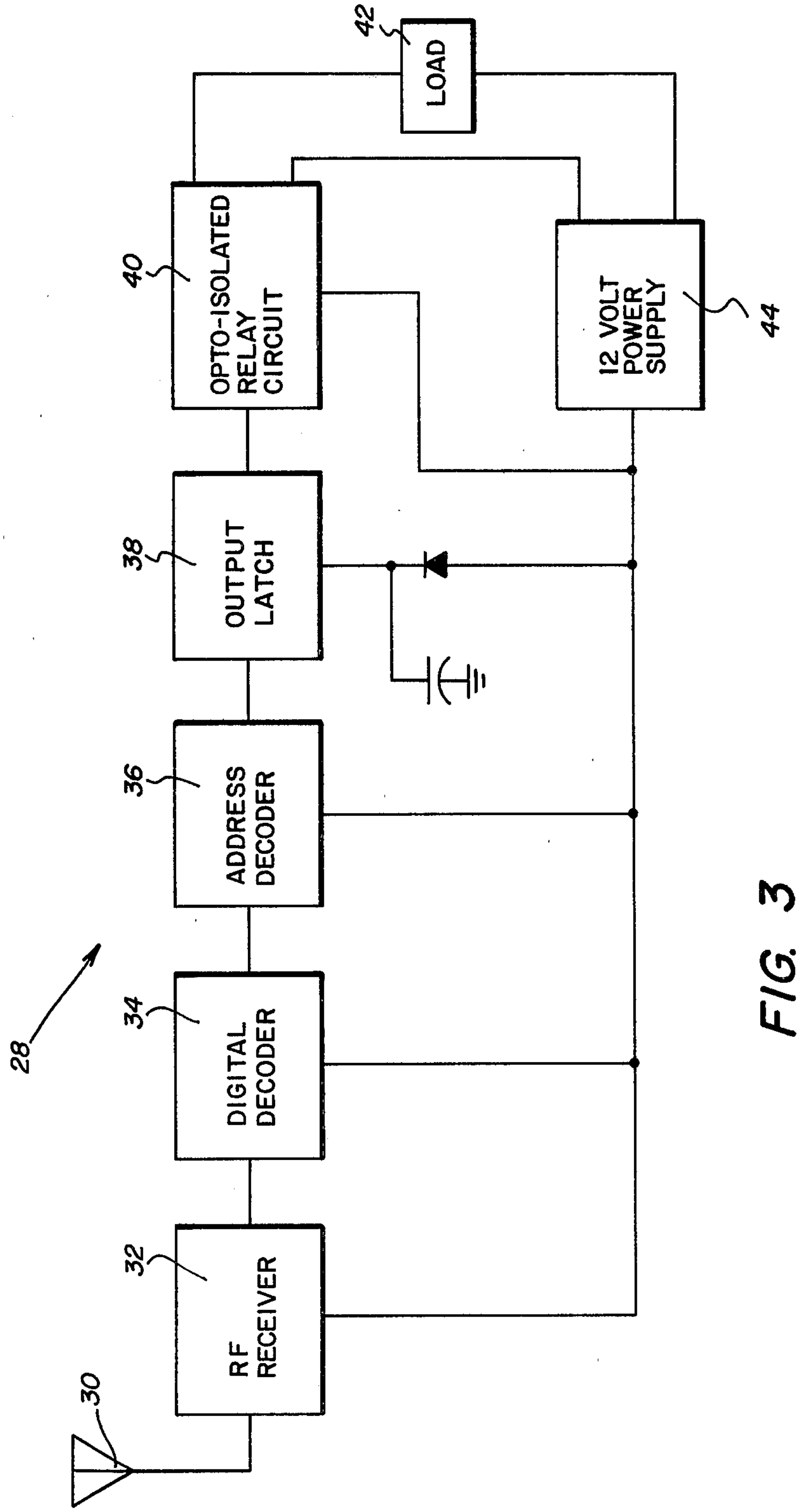
FIG. 3 is a block diagram of the circuitry of a receiver unit.

FIG. 1 illustrates a portable battery operated transmission unit of the radio frequency light control system of the present invention and is generally identified by the numeral 10. A face plate 12 of the transmission unit 10 includes a momentary "on" switch 14 and "off" switch 16 to transmit a digitally encoded pulse to one or more similarly encoded and addressed remote receiver units (FIG. 3). The transmission unit 10 may be operated as a handheld control unit, or it may be fastened to a wall in a similar manner to conventional wired light switches. The transmission unit 10 of the light control system of the present invention is particularly suitable for use in open landscape designed offices to simplify the location and relocation of light switches, since it does not require any path for conduit run wiring between the switch and the light fixture.

Figure 1A:
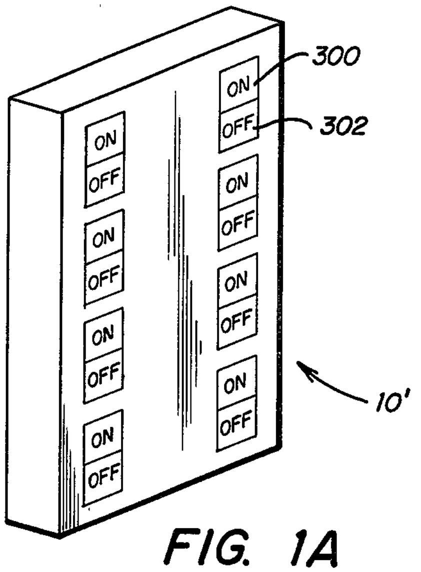
FIG. 1A is a perspective view of a multiple switch transmission unit of the present invention.
Figure 6:
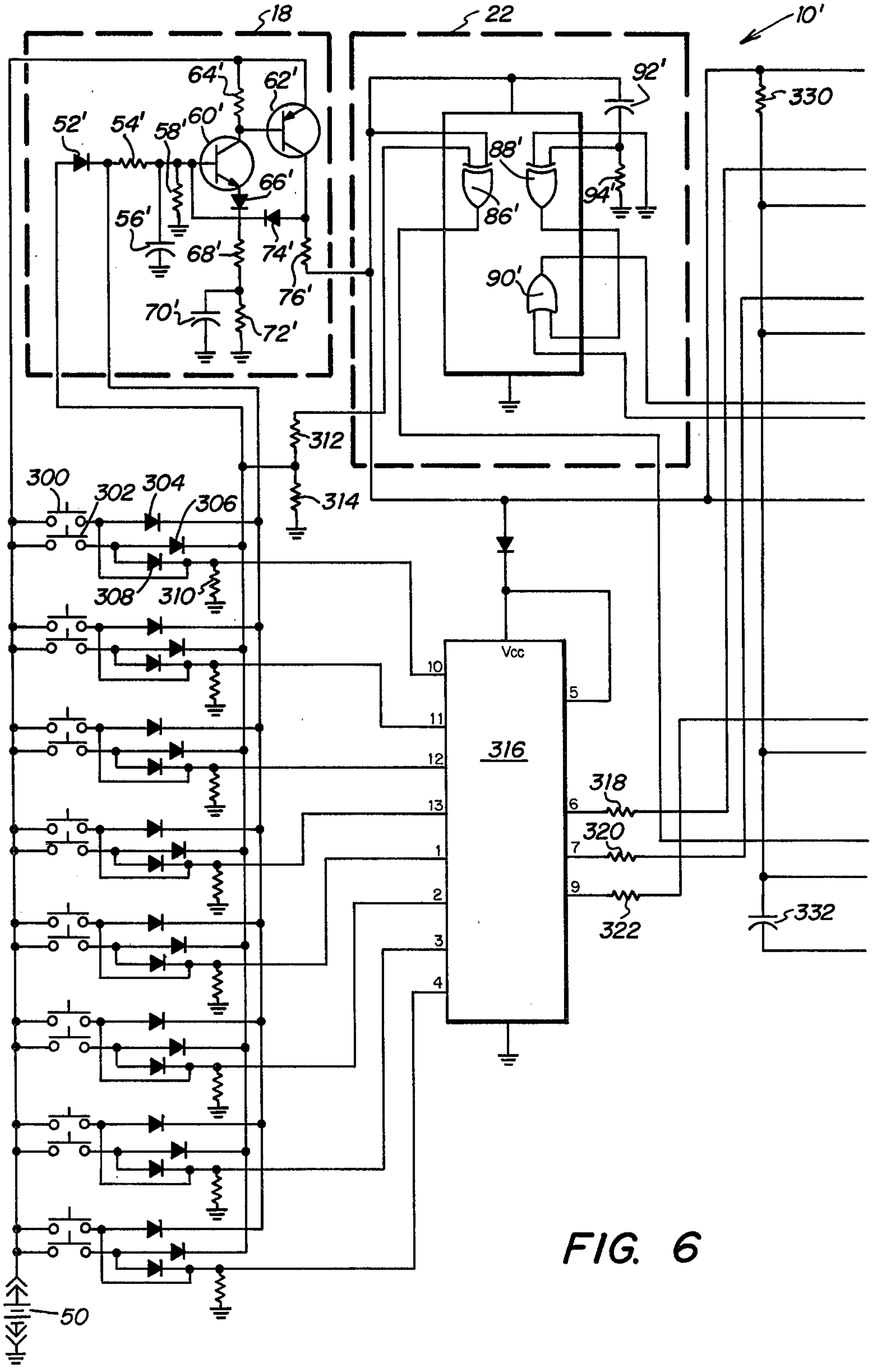
FIGS. 6 and 6A are the wiring diagrams for a multiple switch transmission unit for controlling eight electrical lights.
Figure 6A:
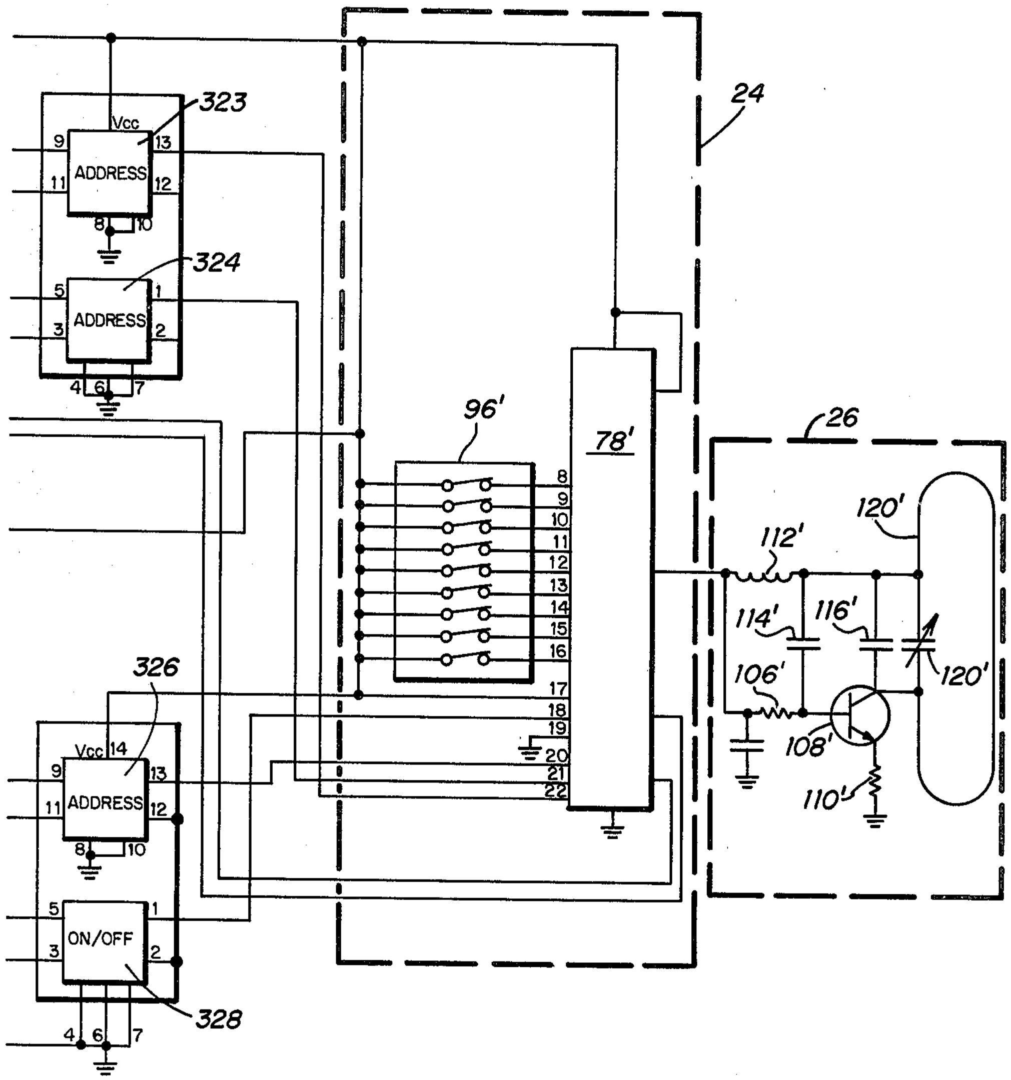

FIG. 1A illustrates a multiple switch transmission unit 10' having a plurality of "on" "off" switches 300 and 302 for selectively addressing any one of the outputs controlled by the switches from one transmitting unit. The multiple switch transmission unit 10' is illustrated in FIGS. 6 and 6A and described further herein below.

Figure 2:
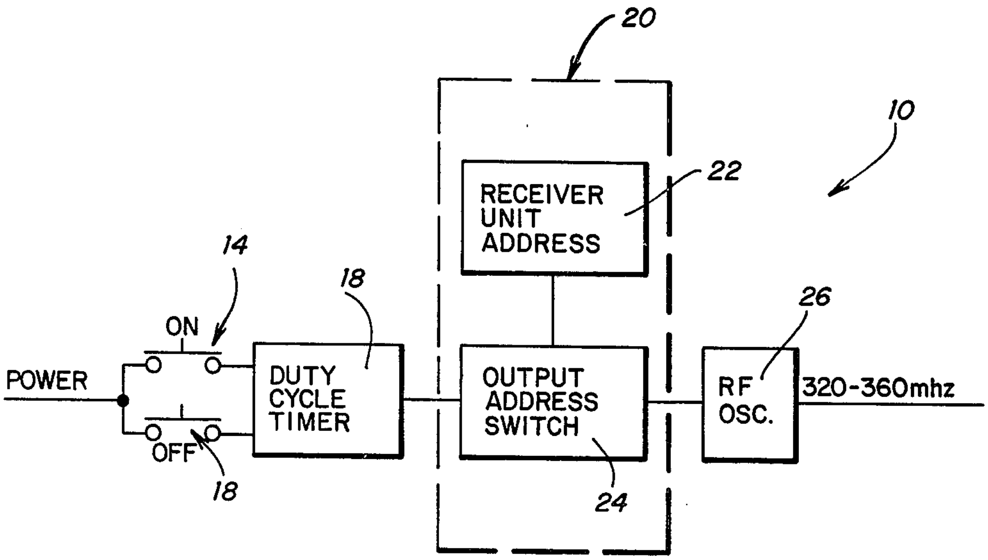
FIG. 2 is a block diagram of the circuitry of the transmission unit.

FIG. 2 is a block diagram of the transmission unit 10 activated by closing either the momentary "on" switch 14 or the "off" switch 16. A duty cycle timer 18 is provided in compliance with paragraph 15.120(b) of the FCC Rules and Regulations for limiting the transmission broadcast time of the transmission unit 10. A digital encoding feature 20 is selected by a field adjustable receiver unit address 22 for modulating the transmission signal with one of a possible 512 codes on output address switch 24. The output address switch 24 is set to address an output of the receiver unit 28. A radio frequency power oscillator 26 is basically a Hartley type oscillator which is pulse modulated by selectively applying or not applying a voltage supplied by the digital encoding circuitry. The oscillator 26 may be tuned over the frequency range 320–360 MHz.

FIG. 3 is a block diagram of the receiver unit 28 with an antenna 30 and a radio frequency receiver 32 operating in the frequency ranges from 320–360 MHz. A digital decoder circuit 34 decodes the encoded pulse modulated transmitted signal, and an address decoder circuit 36 decodes the switch address of the transmitted signal. An output latch 38 is pulsed by the address decoder 36 in response to a match between the transmitted code and the receiver code to drive an opto-isolated relay circuit 40 to latch the control state (on/off) sent by the transmitter. The opening and closing of the relay circuit 40 switches power on and off to an electrical load 42. A 12 volt power supply 44 connected by a transformer to the line power energizers the circuits of the remote receiver unit 28.

Figure 4:
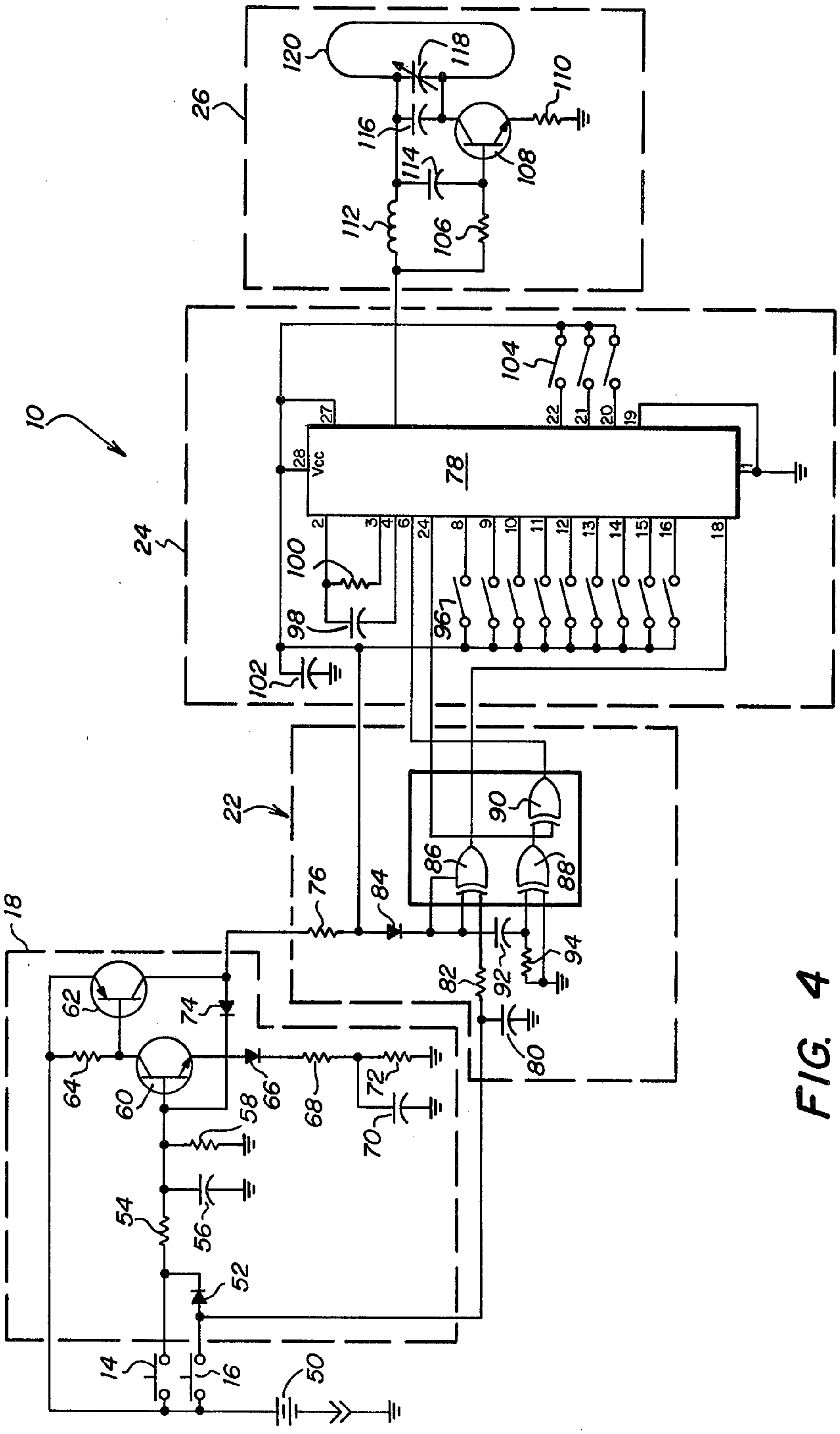
FIG. 4 is a schematic wiring diagram for a transmission unit.

FIG. 4 is a schematic of the single transmitter unit 10 energized by a 9 volt battery 50. Depression of "on" switch 14 or "off" switch 16 starts the transmitter duty cycle timing circuit 18. The depression of the "off" switch 16 causes a signal to be applied both to the digital encoding circuitry 20 as well as to the timing circuit 18.

A diode 52 is placed between the "off" switch 16 and the timing circuit 18 to prevent the voltage from the depression of the "on" switch 14 from effecting the digital encoding circuitry 20. The signal from the momentary switches 14 and 16 is fed through a resistor 54, a capacitor 56 and a second resistor 58, forming a pulse filtering network, to ensure that the signal applied to the base of an NPN transistor 60 enables the transistor to turn on even with a slight depression of one of the momentary switches 14 or 16. The collector of transistor 60 is connected to the base of a PNP transistor 62 and through a pullup resistor 64 to the battery power supply 50. The emitter of the transistor 60 is connected through a diode 66 to a resistor 68 which is connected to ground through a capacitor 70 and a resistor 72.

A thirty second off time is provided to comply with FCC regulations by the size of capacitor 70 and resistor 72, which determines how long it takes capacitor 70 to discharge it to a level to allow it to rebias, so that depression of the momentary switches will not result in transistor 62 turning on before the end of this thirty second period. The depression of the momentary switch 14 or 16 causes the transistors 60 and 62 to act as a two transistor pair one-shot latch and inhibitor. The input trigger voltage to the transistors 60 and 62 is provided by the voltage divider network of resistor 54 and resistor 68. A diode 74 is connected between the collector of PNP transistor 62 and the base of transistor 60 to ensure that the transistor 60 remains on for at least one second, even if there is only a millisecond depression of one of the momentary switches 14 or 16.

The signal from the timing circuit 18 is applied to the positive side of a current limiting resistor 76 which limits the amount of current that is diverted through the Zener diode inside the CMOS encoding chip 78. A capacitor 80 and a resistor 82 are connected to one terminal of the "off" switch 16 to serve as a one-shot or memory latch to hold the voltage level impressed on the receiver unit address circuitry 22 for at least one second even if the momentary switch 16 is depressed for only a fraction of that time. A diode 84 acts to block the voltage level across the resistor 82 from providing power for the CMOS encoding chip 78. A CMOS encoder/decoder chip ED-11 manufactured by SuperTex Inc. may be used as the encoding chip 78.

An exclusive OR gate 86 is used to invert the signal from "off" switch 16. The output of exclusive OR gate 86 is applied to input pin 18 of the encoding chip 78 for providing coding information on the control status of the power supply ("on" or "off"). The absence of a signal from the output of exclusive OR gate 86 provides the chip 78 with the coding information that the "on" switch 14 has been depressed. Exclusive OR gates 88 and 90 are combined with capacitor 92 and resistor 94 to form a one-shot to initiate the "start transmission" signal applied from the output of exclusive OR gate 90 to input pin 6 of the CMOS encoding chip 78. The output from the exclusive OR gate 90 starts the transmission of the first encoded message, and subsequent transmissions are prompted by the CMOS chip 78 which, upon sending one entire transmission, applies a pulse from pin 24 to one input of exclusive OR gate 90. Since there will be no more change of states on the other input pin of exclusive OR gate 90, the input pin pulsed by the CMOS chip 78 provides for the subsequent retransmission, acting as a self-driving network.

The digital encoding of the pulse is provided by setting the switches of the DIP switch 96 for connecting the "power on" signal from the resistor 76 to selected pins 8–16 input of the encoding chip 78. The high or low state provided by the setting of the switches of DIP switch 96 provides for a high or low state to be placed on the selected input pins of the encoding chip 78 to form the digital address of the transmitter. The switch 96 may provide the chip 78 with one of 512 possible codes to be combined with the clock for phase encoding the data (Manchester Code) to be presented at the output pin 7 of chip 78.

Capacitor 98 and resistor 100 determine the oscillator frequency for the digital encoder chip 78. Capacitor 102 is provided as a bypass capacitor for eliminating noise. An additional DIP switch 104 is added to provide additional address information to the output of a receiver unit 28 to determine the address of the output of a receiver 28 to be controlled by this single transmitter.

The phase encoded data from pin 7 of the CMOS chip 78 appears as a serial data stream applied to the input of the radio frequency oscillator 26. The encoded data signal is applied through resistor 106 to the base of an NPN transistor 108 having its emitter connected to ground through a resistor 110. The data encoded signal is also applied through an inductor 112 and a capacitor 114 to the base of the transistor 108. Capacitor 116 and tuning capacitor 118 are connected in parallel from the collector of transistor 108 to the inductor 112 and capacitor 114. An antenna 120 is connected across the tuning capacitor 118 for broadcasting transmission of the encoded data signal to a remote receiver unit 28.

Figure 5:
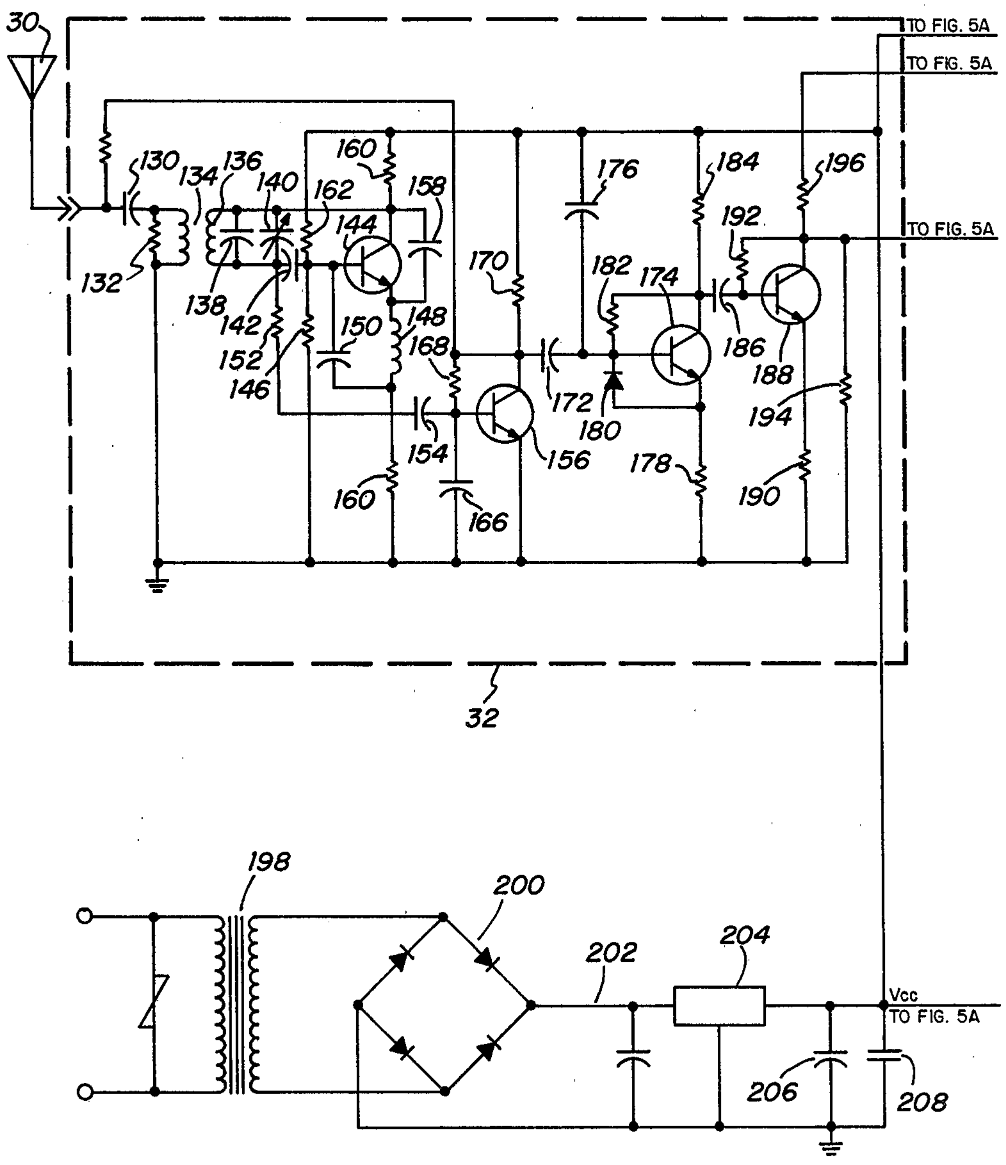
FIGS. 5 and 5A are the wiring diagrams for a single receiver unit.
Figure 5A:
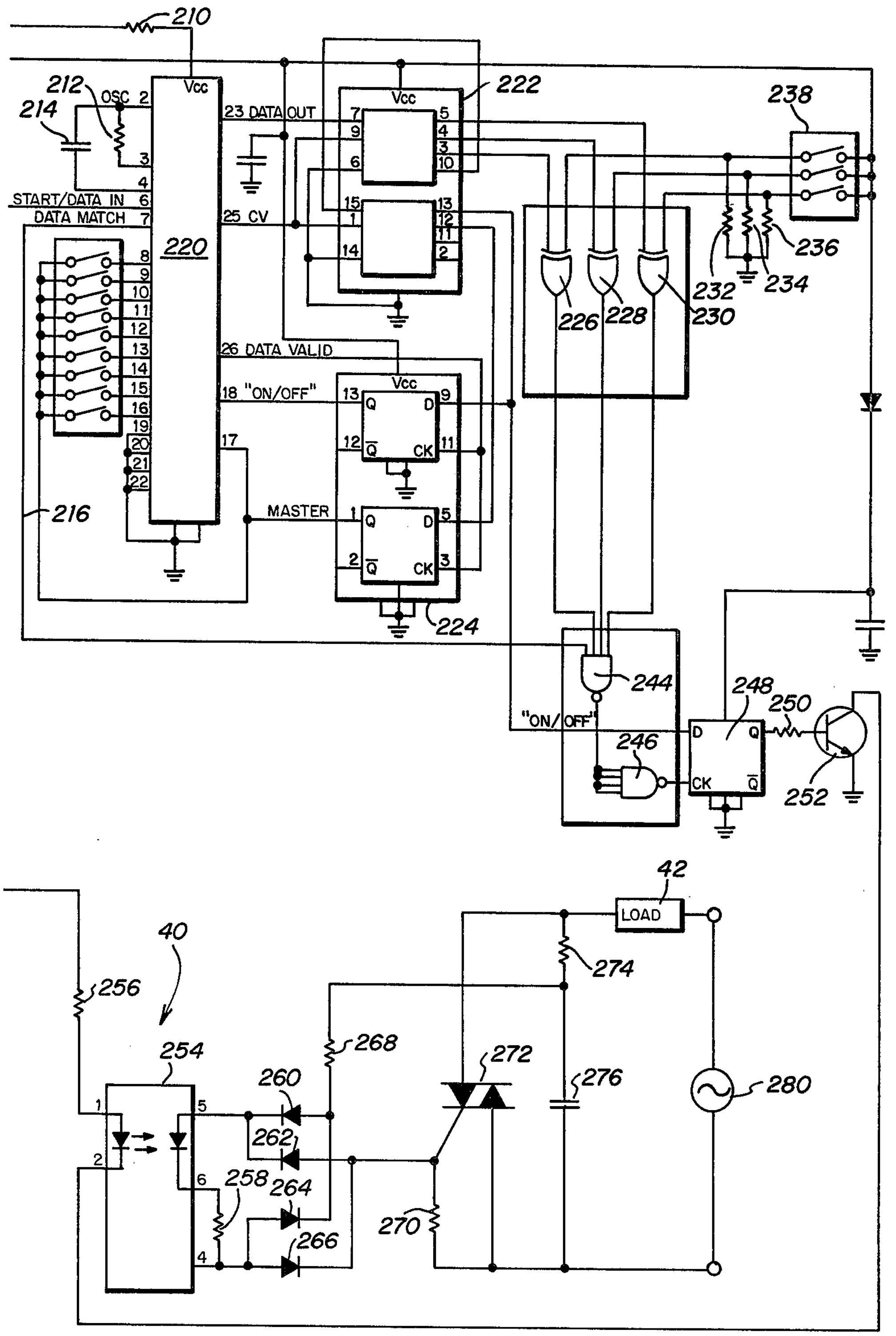

FIGS. 5 and 5A illustrate the schematic for a single control receiver unit 28. An antenna 30 detects a radio frequency signal and applies it to the radio frequency receiver circuitry 32. A radio frequency receiver detects radio frequency energy by a self-quenched superregenerative oscillator detector. The antenna 30 is approximately a quarter wavelength of the receiving frequency. The signal detected by the antenna 30 is applied through a capacitor 130 to one side of a resistor 132 and to one side of a primary inductor coil 134. The other side of resistor 132 and coil 134 are connected to ground. A secondary coil 136 is connected in parallel with a capacitor 138 which in turn is connected in parallel with a variable capacitor 140.

One junction node of the parallel capacitors 138 and 140 and secondary coil 136 is connected through a capacitor 142 to the base of an NPN transistor 144 which acts as the superregenerative oscillator detector. The collector of transistor 144 is connected to the opposite node of the junction of coil 136 and capacitors 138 and 140, and the base of the transistor 144 is connected to ground through a resistor 146. The output from the emitter of the transistor 144 is fed back through an inductor 148 and capacitor 150 to the base of the transistor 144. A resistor 152 and capacitor 154 coupled to one terminal of the variable capacitor 140 form a lowpass filter to remove any radio frequencies from the input to the base of the first stage of amplifying transistor 156. A capacitor 158 is coupled across the collector and emitter of the transistor 144. The collector of the transistor 144 is also coupled through a resistor 160 and 162 to the base of the transistor 144. The emitter of the transistor 144 is also coupled through inductor 148 and a resistor 164 to ground.

The first amplifying transistor 156 has its base coupled to ground through a capacitor 166 and through a resistor 168 to one terminal of the resistor 160. The output from the collector of the transistor 156 is tied to a pullup resistor 170 and through a capacitor 172 to the base of a second amplifying transistor 174. The base of the transistor 174 is coupled through a capacitor 176 to the voltage level $V_{cc}$. The emitter of the second amplifying transistor 174 is connected to ground through a resistor 178, and is also fed back through a diode 180 to the base of the transistor 174. The collector of the transistor 174 is tied to its base through a resistor 182 and tied to a pullup resistor 184. The output from the collector of the transistor 174 is coupled through a capacitor 186 to the base of inverting amplifying transistor 188. The emitter of transistor 188 is tied to ground through a resistor 190, and its collector is tied to its base through a resistor 192. The inverted output from the transistor 188 is applied as the stream of encoded data "START-/DATA IN" to pin 6 of a digital decoding chip 220 (FIG. 5A), and the collector of the transistor 188 is also connected to power supply terminal of the digital encoding chip 220 (FIG. 5A). The encoder/decoder ED-11 manufactured by Supertex, Inc. may be utilized as the decoding chip 220.

The regulated power supply for the receiver unit 28 is illustrated at the bottom of FIG. 5 and includes an iron core transformer 198 connected to the line power to transform the power to 15 volts RMS AC secondary voltage applied to the diode ring 200 to yield 24 volts filtered power to a capacitor 202 and the voltage is applied to the input terminal of a voltage regulator 204 to provide a filtered output through capacitors 206 and 208.

Referring now to FIG. 5A, the filtered output from the regulated power supply described above and shown in FIG. 5 is applied through a current limiting resistor 210 to the $V_{cc}$ terminal of the digital encoding chip 220. Encoding chip 220 has resistor 212 and capacitor 214 which supply the oscillator frequency for the encoding chip 220 in the same manner as the resistor 100 and capacitor 98 provide the oscillating frequency to the encoding chip 78 described above. A DIP switch 216 serves as the "transmission" encoding switch for the receiving unit 28, and the individual switches of the switch 216 may be preset to match any one of the 512 codes available for encoding the transmitter unit 10. Serial data output, the "DATA OUT" signal, from pin 23 of the decoding chip 220 is applied to pin 7 of an 8-bit serial shift register 222. The clock signal from the decoder chip 220 is applied to pin 1 of the shift register 222 to clock the data into the shift register. When the decoder 220 detects a valid signal data bit, a data bit from pin 12 of the shift register 222 is clocked into the latch 224 to indicate a "master" control, and a data bit from pin 13 of the shift register 222 is clocked into the latch 224 as the "on/off" command indicator. The "master" control signal from the latch 224 is applied to pin 17 of the decoder 220 to be used along with the nine address switches to form part of the address matching. The "on/off" control indicator is applied from pin 13 of the latch 224 into pin 18 of the decoder 220 to indicate whether the receiver 28 is to be set in the "on" or "off" state.

After the first signal is received by the latch 224 and set into the decoder 220, thereafter the repetition of the signal from transmitter 10 will continually send the same code and there will be no change on these two inputs to the decoder 220. When a valid match is made with the address and the master control switch of the transmitter 10, the decoder 220 generates a valid address pulse and outputs it on the "DATA MATCH" line to the remainder of the circuit to be discussed.

The last data control bits in the serialized data stream are applied from pins 3, 4 and 5 of the serial register 222 into inputs of exclusive OR gates 226, 228 and 230. The other input to the exclusive OR gates is tied to resistors 232, 234 and 236 which are tied to ground. A second selectable DIP switch 238 has three separate switches, each of said switches having one terminal tied to an input to exclusive OR gates 226, 228 and 230 and the other terminal applied to the power supply for the receiver unit 28. The switch 238 provides a subaddress for the receiver by selectively closing the switches to provide an additional eight subaddresses.

On a valid subaddress match, the output pins of exclusive OR gates 226, 228 and 230 will all be high in conjunction with the "DATA MATCH" output from the decoder 220 and applied to the input of NAND gate 244. The presence of all four high inputs at the NAND gate 244 indicates a valid address match of the primary station plus a subaddress match which generates an output at NAND gate 244 which is applied to the input of NAND gate 246 to set the latch 248. The "on/off" data is latched from the output of pin 13 of the shift register 222. The output of the latch 248 is applied through a resistor 250 to the base of a transistor 252 to drive the opto-isolated relay circuit 40. The output from transistor 252 is applied to one input of a light activated SCR 254 having its second input connected to the receiver power supply through current limiting resistor 256. When the transistor 252 is turned on, current flows into the light activated SCR through a light emitting diode in the chip to activate the gate of the SCR 254. A resistor 258 is connected from pin 6 to pin 4 of SCR 254 to stabilize its operation.

Diodes 260, 262, 264 and 266 form a diode bridge to rectify the alternating current so that there is always a positive half cycle on pin 5 of the SCR 254. Resistor 268 is a current limiting resistor to offer gate protection to the SCR 254. Resistor 270 is provided to protect the gates of the triac 272 activated by the SCR 254. Resistor 274 and capacitor 276 form a snubbing circuit that is provided to control the turning on of the triac 272 if the rate of current change is too high. An electrical power supply 280 is available to energize the load when the triac 272 is fired under the control of the SCR 254 in response to appropriate command from a master transmitting unit 10.

FIGS. 6 and 6A illustrate the schematic wiring diagram for a multiple switch transmitting unit, designated by the numeral 10'. The multiple transmitter unit 10' includes a duty cycle timer 18, a receiver unit address 22, code address switch 24 and a radio frequency oscillator 26 which are identical to the corresponding circuitry in the transmitter unit 10 (FIG. 4), and circuit components that are identical to components in transmission 10 are designated with a "'" reference numeral.

The transmission unit 10' is powered by a battery pack 50' to provide power to eight pairs of "on/off" switches for allowing one transmission unit to separately control eight remote receiver units 28. Since the pairs of on/off switches and their associated circuitry are identical, only the first pair of switches 300 and 302 and its associated diode matrix of diodes 304, 306, 308 and resistor 310 need be described.

Depression of the "on" button 300 provides a signal through the diode 304 to the timing circuitry 18 and to the remaining circuitry of transmission unit 10'. Depression of the "on" button 300 also causes a signal to pass through the diode 304 to resistor 54' of the timing circuit 18. Depression of the "off" button 302 causes a signal current to flow through diode 308 and then through diode 52' to timing circuitry 18 and develops a voltage across resistors 312 and 314 to provide one input to the exclusive OR gate 86' of the receiver unit address 22. The diode 308 ties together the inputs of the momentary "on/off" switches 300 and 302 and supplies a signal to a pulldown resistor 310 to provide one input to the eight input terminals (pins 10, 11, 12, 13, 1, 2, 3, 4) of an eight line to three line encoder chip 316. The encoder chip 316 takes the input from the eight individual lines from the eight on/off switches to generate a binary code at its output pins 6, 7 and 9 to then use the output in the digital circuitry of the transmission unit 10' to signal which one of the eight receiver units 28 is addressed. Current limiting resistors 318, 320 and 322 are provided to limit the current from the output ports of the encoder chip 316 to be applied to the remaining of the dircuit.

The output pulses from the encoding chip 316 provide a latching pulse to latches 323, 324 and 326 to latch the binary address of the receiving unit addressed by the transmission unit 10'. A "on/off" latching pulse is applied from the output of exclusive OR gate 86' to latch the "on/off" condition in latch 328. Resistor 330 and capacitor 332 will latch the addresses in the "on/off" state in latches 323, 324, 326 and 328 when power is initially applied to the circuit by depressing one of the "on/off" switches. The output from the latches 323, 324 and 326 are applied to terminal 22, 21 and 20 of the encoding chip 78' and the output from the "on/off" latch 328 is applied to input terminal 18 of encoding chip 78 for transmitting the "on/off" condition to be fed in the addressed receiver unit. The encoding switch 96' and the oscillator circuitry 26 operate in a similar manner described in FIG. 4 above for the single transmitter unit.

Figure 7:
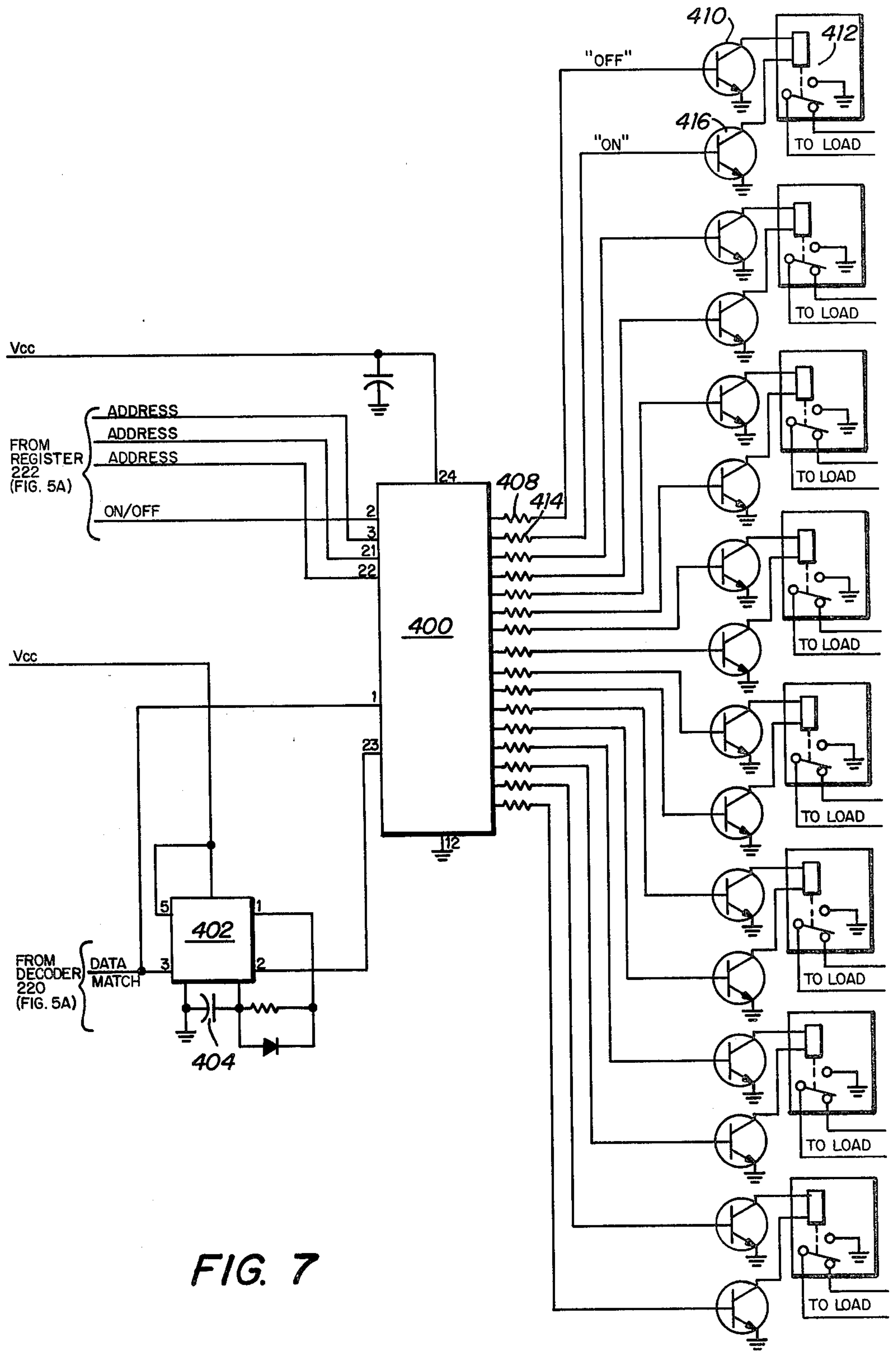
FIG. 7 is a portion of the wiring diagram for a receiver unit controlling eight electrical lights.

FIG. 7 illustrates a portion of the decoding circuitry for a multiple receiver control unit. The multiple receiver unit circuitry omitted is identical to that of a single receiver unit illustrated in FIGS. 5 and 5A and described above up to the output from the address decoder from the serial register 222 and data decoder 220. The switch address information from pins 5, 4 and 3 of the serial register 222 are applied to the input of pins 3, 21 and 22 of a four line to sixteen line decoder chip 400. The "on/off" condition signal from pin 13 of register 222 is applied to input pin 2 of the decoder 220. The "Data Match" signal from the output of decoder 220 is applied both to the input pin 1 of decoder chip 440 and the input pin 3 on CMOS flip-flop 402, configured as a one shot to provide approximately a half second pulse from pin 2 into the decoder 400. When a valid address signal or Data Match pulse is applied from the decoder 220 to pin 3 of the flip-flop 402, the positive edge of the pulse immediately sets the flip-flop pin 1 high which makes pin 2 go low. When pin 1 of flip-flop 402 goes high it starts charging capacitor 404 through resistor 406, then when capacitor 404 reaches approximately half $V_{cc}$, pin 4 goes high which resets the flip-flop 402 and drives pin 1 to a low generating a momentary pulse from flip-flop 402. This low going pulse is applied to pin 23 of the decoder chip 400 as described above. The pulse applied from flip-flop 402 allows the four line to sixteen line decoder 400 to select which of the set outputs is to go high to control the on/off state of eight lights.

Since the circuitry connected to each of the sixteen output ports of the decoder 400 are identical, they may all be described by describing the circuitry for the first two output ports. The pulse from the first output port is applied through a resistor 408 to the base of a NPN transistor 410 which has its emitter connected to ground. A positive going pulse from the output port of decoder 400 would turn the mechanical relay 412 "on". In order to turn the mechanical relay 412 "off", a positive pulse from the second output of terminal decoder 400 is applied through a resistor 414 to the base of an NPN transistor 416 to turn the transistor 416 on to change the state of the mechanical relay 412. The mechanical relay 412 is connected to electrical load (not shown) to turn the power on or off to the electrical load. Of course, electronic relays could be substituted for mechanical relays to control the power supply to the electrical load 42.

While the transmission units 10 and receiver units 28 of the light control system of the present invention have been described in detail herein in embodiments as single and multiple transmitters and receivers, it will be evident that various and further modifications are possible without departing from the scope and spirit of the present invention.

We claim:

1. A remote control light system for controlling the power applied to an electrical light source, comprising:

a battery operated transmission unit having a radio frequency oscillator for transmitting a radio frequency control signal;

a receiving unit energized by a power supply connected to the power source for energizing the electrical light, said receiving unit having an antenna and a radio frequency receiver for detecting signals transmitted from said transmission unit;

switching means located in said transmission unit for selecting the on/off control state for the electrical light attached to the receiving unit;

reprogrammable encoding means for selecting a receiver unit address code to be broadcast by said radio frequency oscillator;

reprogrammable encoding means for selecting the output address code of a receiving unit;

means for digitally encoding the control state signal from said switching means, receiver unit address code and output address code and pulse modulating said encoded data for transmission by said radio frequency oscillator to broadcast said encoded data to said receiver unit;

means for said receiving unit to decode a signal detected by said antenna and radio frequency receiver;

reprogrammable encoding means in said receiving unit for selecting a receiver unit address code to match the receiver unit address code set in said transmission unit;

reprogrammable encoding means in said receiving unit for selecting an output address of said receiver to match an address set in said transmission unit;

means for comparing said transmitted receiver unit and output address code with said receiver unit code and output address code encoded in said receiver;

means for setting a latch with the on/off control signal from said digital decoder in response to said comparing means indicating said transmitted receiver unit address code and output address code is equivalent to the receiver unit address and output address code preset in said receiver; and a relay settable in response to an output signal from a said latching means for connecting or disconnecting an electrical light to a power supply.

2. The remote control light system of claim 1 wherein said latching means includes means for retaining the on/off control signal whereby the control state signal applied to said relay is retained in the event power is interrupted to said receiving unit to cause the electrical light to be set in the same state when power is returned to the light.

3. The remote control light system of claim 1, wherein said relay circuit is an opto-isolated relay circuit.

4. The remote control light system of claim 1 and further comprising means for a master override control signal to be applied to said receiving unit to set the on/off control state to be applied to said output latch and said relay, whereby said receiving unit may be operated from a remote master location to control all receiving units in a light control system.

5. The remote control light system of claim 1, wherein said means for digitally encoding comprises means for phase encoding said unit address code and said output code.

6. A remote control light system for connecting and disconnecting an electric light to a source of power, comprising:

a battery operated transmission unit having a radio frequency oscillator for broadcasting a radio frequency signal;

a plurality of receiving units having antennas and radio frequency receivers for detecting a signal from said transmission units, said receiving units being connected to an electric light and a source of power to the light;

a plurality of on/off switches for separately selecting the control state of the power to be applied at said receiving unit to the electric light;

means for digitally encoding the control signal from said on/off switches;

means for selecting a receiver unit address code for pulse modulating said radio frequency oscillator;

means for digitally encoding the control state signal from one of said on/off switches and said receiver unit address code for pulse modulating said radio frequency oscillators;

digital decoding means in said receiving units for decoding the receiver unit address code and switch address code detected by said antenna and receiver circuit;

means for encoding a receiver unit address code and a switch address for each of said receiving units;

means for comparing the detected signal receiver unit address code and switch address code with the receiver unit address and switch address code of said receiving units;

means for setting a latch with said control state signal received by said receiving unit in response to said comparison means comparing equal; and relay means responsive to said latching means for connecting and disconnecting an electrical light to a source of power.

7. The remote control light system of claim 6 and further comprising:

means for retaining said control state signal applied to said latching means if power is interrupted to said receiving circuit, whereby the electric light is on the same control state when power is restored to the system.

8. The light control system of claim 6, wherein said receiver unit address codes set in said transmitting unit are field reprogrammable.

9. The light control system of claim 6, wherein said receiver unit address codes set in said receiving unit are field reprogrammable.

10. The light control system of claim 6, and further comprising means in a receiving unit for controlling the power to one of a plurality of electrical lights controlled by said receiving unit in response to an encoded data signal from said transmitting unit.

* * * * *

UNITED STATES PATENT AND TRADEMARK OFFICE

CERTIFICATE OF CORRECTION

PATENT NO. : 4,355,309

DATED : October 19, 1982

INVENTOR(S) : Robert M. Hughey, James J. Fairchild and James H. Brown

It is certified that error appears in the above—identified patent and that said Letters Patent is hereby corrected as shown below:

Column 8, line 16, change "dircuit" to --circuit--.

Signed and Sealed this

*Fifteenth* Day of *March 1983*

[SEAL]

*Attest:*

GERALD J. MOSSINGHOFF

*Attesting Officer* *Commissioner of Patents and Trademarks*